United States Patent [19]

Pampouchidis et al.

[11] 4,237,038

[45] Dec. 2, 1980

[54] CATHODICALLY DEPOSITABLE RESINS AND PROCESS OF PREPARING SAME

[75] Inventors: Georgios Pampouchidis; Helmut Hönig, both of Graz, Austria

[73] Assignee: Vianova Kunstharz, A.G., Werndorf, Austria

[21] Appl. No.: 950,599

[22] Filed: Oct. 12, 1978

[30] Foreign Application Priority Data

Oct. 24, 1977 [AT] Austria .................... 7567/77

[51] Int. Cl.³ .................... C08K 3/06; C08G 18/77; C25D 13/06
[52] U.S. Cl. .................... 260/29.2 TN; 204/181 C; 528/59; 528/71; 528/75; 528/78;
[58] Field of Search .................... 528/75, 49, 78, 71, 528/69; 260/29.2 TN; 204/181 C

[56] References Cited

U.S. PATENT DOCUMENTS

| | | | |
|---|---|---|---|
| 3,284,377 | 11/1966 | Merten et al. | 528/78 |
| 3,786,030 | 1/1974 | Rice | 528/49 |
| 3,804,786 | 4/1974 | Sekamakas | 260/29.2 EP |
| 3,864,133 | 2/1975 | Hisamatsu et al. | 96/115 P |
| 3,896,158 | 7/1975 | Rice | 528/49 |
| 3,932,561 | 1/1976 | Zamer | 528/78 |
| 4,031,050 | 6/1977 | Jerabek | 204/181 C |
| 4,036,800 | 7/1977 | Sekmakas | 204/181 C |
| 4,096,105 | 6/1978 | McGinniss | 204/181 C |
| 4,129,490 | 12/1978 | Schimmel | 204/181 C |
| 4,147,676 | 4/1979 | Pampouchidis | 528/75 |
| 4,147,679 | 4/1979 | Scriven et al. | 260/29.2 TN |
| 4,172,191 | 10/1979 | Nachtkamp et al. | 260/29.2 TN |
| 4,174,332 | 11/1979 | Hoenig et al. | 260/29.2 TN |
| 4,176,099 | 11/1979 | Pampouchidis et al. | 528/75 |
| 4,179,425 | 12/1979 | Pampouchidis et al. | 528/75 |

*Primary Examiner*—H. S. Cockeram
*Attorney, Agent, or Firm*—A. W. Breiner

[57] ABSTRACT

Binders for cathodically depositable aqueous coating compositions comprising the reaction product, having an NCO-value of zero, of (A) polymers carrying reactive hydroxyl groups and having a hydroxyl number of at least about 40 mg KOH/g; and (B) compounds carrying per molecule an average of 0.8 to 1.5, and preferably 1.0, free isocyanate groups and at least one teritary basic aliphatically bound nitrogen atom.

Optionally, the reaction product of (A) and (B) can include as (C) a compound carrying an average of 0.8 to 1.5, and preferably 1.0, free isocyanate groups and from 1 to 3 olefinic double bonds.

Coating compositions containing the partially or totally neutralized reaction product when depositrd cathodically in an electrodeposition system will cure at relatively low temperatures and relatively short curing times to provide films having good resistance to water, chemicals, and corrosion.

18 Claims, No Drawings

CATHODICALLY DEPOSITABLE RESINS AND PROCESS OF PREPARING SAME

The present invention is directed to synthetic resins. More particularly, the invention is directed to synthetic resins which are suitable for deposition from aqueous solutions of the resins at the cathode of an electrodeposition coating system.

As known to one skilled in the art, to prepare synthetic resins which are depositable at the cathode of an electrodeposition system from their aqueous solutions in a direct current circuit, it is necessary to introduce into the resins basic functional groups which are at least partly neutralizable with inorganic or organic acids to obtain water solubility. The introduction of a basic functional group, such as a basic nitrogen atom, is carried out according to known methods, by reaction of an epoxy group with a secondary amine, or through copolymerization of an alpha,beta-ethylenically unsaturated monomer containing basic nitrogen functionality with alpha, beta-unsaturated monomers. Such methods, however, utilize raw materials which are available to only a limited extent and/or are expensive. Thus, cataphoretic electrodeposition coatings and the advantages thereof, including elimination of spot discoloration or other chemical changes as a result of metal ions anodically dissolved from the anode, are not possible for all applications.

Accordingly, a primary object of the present invention is to provide synthetic resins which contain basic functional nitrogen groups so as to permit deposition from their aqueous solutions at the cathode of an electrodeposition system prepared from readily available raw materials which are relatively inexpensive, but which provide coating compositions having excellent resistance to water, chemicals, and corrosion.

According to the present invention, basic functional nitrogen groups are introduced into resinlike prepolymers containing hydroxyl groups. More specifically, according to the present invention, heat-hardenable polymer binders for use in cathodically depositable coating compositions are provided characterized in that polymers carrying hydroxyl groups and having a hydroxyl number of at least about 40 mg KOH/g are reacted with compounds carrying per molecule an average of 0.8 to 1.5, and preferably 1.0, free isocyanate groups and at least one tertiary basic aliphatically bound nitrogen atom at a temperature of from about 10° to about 100° C., preferably 50° to 80° C., to an NCO-value of zero. The reaction product is partially or totally neutralized with inorganic or organic acids to provide an aqueous solution of the binder. Optionally, the reaction product can include the moiety of a molecule carrying an average of 0.8 to 1.5, and preferably 1.0, free isocyanate groups and from 1 to 3 olefinic double bonds. The reaction can be carried out in the presence of solvents inert to the isocyanates and of catalysts.

Polymers containing hydroxyl groups suitable for use in the present invention can be prepared in a simple and convenient manner from a variety of raw materials. For example, polymers having a hydroxyl number of at least about 40 mg KOH/g can be prepared through solution polymerization of alkyl esters of acrylic and/or methacrylic acid and hydroxyalkyl(ene)esters of acrylic and/or methacrylic acids, optionally containing additional modifiers besides the hydroxyl groups. Suitable alkyl esters include methyl(meth)acrylate, ethyl(meth)acrylate, propyl(meth)acrylate, n-butyl(meth)acrylate, isobutyl(meth)acrylate, n-hexyl(meth)acrylate, and 2-ethylhexyl(meth)acrylate. Further, styrene, chlorostyrene, tert. butylstyrene, vinyltoluene, vinylacetate, and small quantities of (meth)acrylic acid, (meth)acrylamide or acrylonitrile can also be used to provide a copolymer. Suitable hydroxyalkyl(ene)esters include hydroxyethyl(meth)acrylate, 3-hydroxypropyl(meth)acrylate, 4-hydroxybutyl(meth)acrylate, 3-hydroxybutyl(meth)acrylate, 2-hydroxyhexyl(meth)acrylate, 6-hydroxyethyl(meth)acrylate, tripropyleneglycolmono(meth)acrylate, tetrapropyleneglycolmono(meth)acrylate. Small quantities of vinyl alcohols or allyl alcohols can also be used to provide a copolymer. The copolymers can optionally be modified, e.g., by reacting the carboxy groups present with, e.g., tris-hydroxymethylamine, to form oxazoline ring structures with free hydroxy groups.

Basic nitrogen atoms are introduced into the preformed copolymers having a hydroxyl number of at least 40 mg KOH/g by reaction with compounds carrying in the molecule an average of from 0.8 to 1.5 isocyanate groups and at least one tertiary basic nitrogen atom. Preferably, the compounds contain an average of about one isocyanate group per molecule. These compounds are prepared by reacting a diisocyanate or polyisocyanate with less than stoichiometric quantities of an amine of the general formula

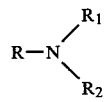

wherein R is an alkanol or hydroxyphenyl radical and $R_1$ and $R_2$ are alkyl or cycloalkyl. The dialkanol amines such as dimethylethanol amine, diethylethanolamine and their higher homologues and isomers are preferred. Suitable di- or polyisocyanates include aromatic isocyanates such as 2,4 or 2,6-tolulenediisocyanate and blends thereof, 4,4'-diphenylmethanediisocyanate, or cycloaliphatic isocyanates such as isophorone diisocyanate, cyclohexane-1,4-diisocyanate, as well as aliphatic isocyanates, such as trimethylhexamethylene-1,6-diisocyanate and tris-hexamethylenetriisocyanate. The reaction between the amine and the diisocyanate or polyisocyanate is effected at from about 0° to 80° C., and preferably at from about 20°–50° C. The weight ratios between the reaction partners are chosen such that the compound formed contains from 0.8 to 1.5, preferably 1, free isocyanate group. The compound is at times hereinafter called the "basic isocyanate intermediate."

In order to enhance the thermal crosslinking of the cathodically deposited coatings, it may optionally be desirable to react the reaction products with further compounds carrying in the molecule an average of from about 0.8 to 1.5 free isocyanate groups and from 1 to 3 olefinically unsaturated double bonds. Such compounds are prepared in a separate reaction step from the aforementioned diisocyanates and polyisocyanates with reaction partners to provide in addition to the isocyanate group from 1 to 3 olefinic double bonds. Suitable unsaturated compounds include the hydroxyalkylesters of acrylic acid or methacrylic acid, triethyleneglycolmono(meth)acrylate, trimethylolpropanedi(meth)acrylate, allylalcohol, tripropyleneglycolmonoabietate, oleyl alcohol or linoleyl alcohol. The reaction between the diisocyanate or polyisocyanate and the isocyanate reactive olefinically unsaturated compound can be carried out in solvents inert to isocyanates at temperatures of from 10° to 100° C., preferably from 50° to 80° C., optionally in the presence of organic stannous compounds as catalyst. The weight ratios between the reaction partners are chosen in order that the compound formed has from 0.8 to 1.5, and preferably 1, free isocyanate groups per molecule. This optional compound is at times hereinafter called the "olefinically unsaturated isocyanate intermediate."

The process of the invention is carried out in order that the above-mentioned hydroxy group containing copolymers, preferably dissolved in isocyanate-inert solvents, and the desired quantity of the basic isocyanate intermediate and, optionally, the olefinically unsaturated isocyanate intermediate are reacted at from 10° to 100° C., preferably 50° to 80° C., optionally in the presence of organic stannous compounds as catalyst, until an NCO-value of practically zero is attained. The quantity of basic isocyanate intermediate is normally chosen in order that the basicity of the binder system, upon neutralization with the acid, gives satisfactory water dilutability at a pH-value of from 4 to 8, preferably 5 to 7. The reaction between the hydroxy containing copolymers, the basic isocyanate intermediate and the olefinically unsaturated isocyanate intermediate can be effected in random sequence, separately or jointly.

For reducing the stoving temperature or for obtaining a particularly good corrosion protection of the coatings, it can be advantageous to coemploy additional known crosslinking agents, such as the urea-, melamine-, or phenolformaldehyde condensates. These resins are prepared by known methods through condensation of formaldehyde and substances splitting off formaldehyde with urea, melamine, benzoguanamine, acetoguanamine, phenol, cresol, p-tert. butylphenol, Bisphenol A, and the like. Optionally, the methylol compounds may be etherified with alcohols. A preferred product is the reaction product of phenol with formaldehyde-containing allyl ether groups. If the crosslinking agent selected is not water soluble, it can be conveniently combined with the binder prepared according to the invention through careful condensation at temperatures of from 50° to 120° C. The reaction is carried on to the extent that satisfactory dilutability with water of the total reaction mass upon neutralization with acids is obtained.

The basic nitrogen atoms of the coating composition of the invention are partially or totally neutralized with organic and/or inorganic acids. The degree of neutralization in the individual case depends upon the properties of the binder selected. In general, sufficient acid is added to render the coating composition dilutable or dispersible with water at a pH-value of from 4 to 8, and preferably of from 5 to 7.

The concentration of the binder depends upon the parameters at processing in the electrodeposition process and ranges from about 3 to 30 percent by weight, preferably 5 to 15 percent by weight. The composition being processed may optionally contain various additives such as pigments, extenders, surface active groups, and the like.

Upon electrodeposition the aqueous coating composition containing the binder of the invention is wired to an electrically conductive anode and an electrically conductive cathode, the surface of the cathode being coated with the coating composition. A variety of electrically conductive substrates may be coated, such as steel, aluminum, copper, etc., or the metalized plastics or other materials covered with a conductive coating.

After deposition, the coating is optionally rinsed with water and cured at elevated temperature. For curing, temperatures of from 130° to 200° C., preferably 150° to 190° C., are utilized. The curing time is normally from about 5 to 30 minutes and preferably 10 to 25 minutes.

The following examples illustrate the invention without limiting the scope thereof. Parts are by weight unless otherwise stated.

PREPARATION OF THE INTERMEDIATES

(A) Hydroxy Groups Containing Polymers

In a reaction vessel equipped with stirrer, thermometer, inert gas supply, and reflux condensor, about 1/5 or 20 percent of a solution of 666 parts ethylglycolacetate containing the monomer mixture as hereinafter stated, 30 parts azobisisobutyronitrile, and 50 parts dodecylmercaptan are charged and heated to reflux temperature while stirring. In the course of 1 to 2 hours, the remainder of the monomer mixture as hereinafter stated is added dropwise. Then the batch is stirred while maintaining reflux temperature, until the theoretical solids content is attained, which normally is about four hours.

Intermediate Component A-1

500 parts—n-butylacrylate
400 parts—2-hydroxyethylacrylate
100 parts—styrene

Intermediate Component A-2

400 parts—n-butylacrylate
500 parts—4-hydroxybutylacrylate
100 parts—styrene

Intermediate Component A-3

360 parts—n-butylacrylate
400 parts—2-hydroxyethylmethacrylate
140 parts—tripropyleneglycolmonomethacrylate
100 parts—styrene

Intermediate Component A-4

300 parts—n-butylacrylate
250 parts—2-hydroxyethylacrylate
290 parts—4-hydroxybutylacrylate
40 parts—acrylamide
120—styrene

(B) Basic Isocyanate Intermediates

Intermediate Component B-1

In a three-neck reaction vessel equipped with reflux condensor and inert gas supply, 174 g of toluene diisocyanate (blend of 80 percent of the 2,4- and 20 percent of the 2,6-isomer) are reacted uniformly with 89 g of dimethylethanolamine, diluted to 60 percent with ethyleneglycolmonoethyletheracetate, while cooling and preventing any access of moisture. The reaction temperature must not exceed 30° C. The reaction is ended when the isocyanate content has attained the theoretical value of 16 percent or less.

Intermediate Component B-2

174 g of toluene diisocyanate (blend of 80 percent of the 2,4- and 20 percent of the 2,6-isomer) are blended with 194 g of ethyleneglycolmonoethyletheracetate in a three-neck reaction vessel with reflux condensor, inert gas supply, with absolute prevention of moisture access. With cooling, 117 g of diethylethanolamine are added continuously within one hour at 30° C. The isocyanate level of the final product is 14.4 percent.

(C) Olefinically Unsaturated Isocyanate Intermediates

Intermediate Component C-1

In a three-neck reaction vessel with reflux condensor and inert gas supply 168 g of hexamethylenediisocyanate are mixed with 200 g of ethyleneglycolmonoethyletheracetate, and heated to 60° C. while preventing access of moisture. At this temperature a blend of 130 g of hydroxyethylmethacrylate stabilized with 0.1 g of hydroquinone is added dropwise. The reaction is ended after about two hours, when the isocyanate level is 14.1 percent or slightly less.

Intermediate Component C-2

In a three-neck reaction vessel with reflux condensor and inert gas supply, 222 g of isophorone diisocyanate and 325 g of ethyleneglycolmonoethyletheracetate are mixed and heated to 40° C., preventing access of moisture. 116 g of hydroxyethylacrylate are continuously added and, at the end of the addition, the temperature is raised to 70° C. and held until the isocyanate value has attained 12.5 percent.

Intermediate Component C-3

In a reaction vessel 277 g of ethylglycolacetate and 174 g of toluene diisocyanate (blend of 80 percent of the 2,4- and 20 percent of the 2,6-isomer) are charged and, while preventing access of moisture, 242 g of trimethylolpropanediacrylate are added within one hour at 25°-35° C. Then the batch is heated to 60°-70° C. and stirred at this temperature, until an isocyanate value of about 10 percent is attained.

Intermediate Component C-4

As in C-3; however, 193 g of ethylglycolacetate and 174 g of toluylenediisocyanate are charged and 116 g of hydroxyethylacrylate are added dropwise.

EXAMPLES 1-9

In a reaction vessel equipped with stirrer, addition funnel, thermometer and reflux condensor, the hydroxy-rich polymer (Intermediate Component A), optionally in the presence of a solvent inert to isocyanates such as ethyleneglycolmonoethyletheracetate, the basic isocyanate (Intermediate Component B) is added, preventing access of moisture, and subsequently, is completely reacted at 40° to 100° C. Then, the reaction product is mixed with an aliphaⅡ,beta-olefinically unsaturated isocyanate intermediate (Intermediate Component C) and, at a temperature of from about 40° to 100° C., is reacted to an NCO-value of zero. The reaction of Intermediate Component A with Intermediate Component B and Intermediate Component C can also be effected in one reaction step at from 40° to 100° C. without substantially different results.

The quantities of the intermediate components and the reaction conditions are listed in Table 1.

TABLE 1

| Example Number | Intermediate Components (g)+ | | | Reaction Conditons++ hours/°C. |
|---|---|---|---|---|
| | (A) | (B) | (C) | |
| 1 | 1000 A-1 | 395 B-1 | 298 C-1 | 4/70 |
| 2 | 1000 A-1 | 395 B-1 | 290 C-4 | 3/70 |
| 3 | 1000 A-2 | 524 B-2 | 416 C-3 | 3/70 |
| 4 | 1000 A-2 | 447 B-1 | 435 C-4 | 3/70 |
| 5 | 1000 A-3 | 395 B-1 | 506 C-2 | 4/70 |
| 6 | 1000 A-3 | 524 B-2 | 540 C-3 | 4/70 |
| 7 | 1000 A-4 | 395 B-1 | 506 C-2 | 4/70 |
| 8 | 1000 A-4 | 473 B-1 | 540 C-3 | 3/70 |
| 9 | 1000 A-4 | 447 B-1 | 493 C-4 | 3/70 |

+ All quantities refer to resin solids.
++ Intermediate Components B and C are jointly reacted.

EVALUATION OF THE BINDERS 100 g resin solids samples of each binder were mixed with the designated quantity of acid and made up to 1000 g with deionized water while stirring. The 10 percent solutions were deposited on various substrates as the cathode of an electrodeposition system. Deposition time in all cases was 90 seconds. The coated substrates were rinsed with deionized water and cured at elevated temperature. The average film thickness of the cured films was between 13 to 17 μm. Evaluation results are listed in Table 2.

TABLE 2

| Ex. | Neutralization | | | Deposition | | Evaluation | | |
|---|---|---|---|---|---|---|---|---|
| | Quantity 1 | Type 2 | pH 3 | Volt | Curing Min/°C. | Hardness 4 | Indentation 5 | Resistance 6  7 |
| 1 | 3.5 | E | 5.8 | 180 | 30/190 | 160 | 7.9 | 320/240 |
| 2 | 2.8 | A | 6.2 | 280 | 20/180 | 165 | 7.1 | 360/240 |
| 3 | 3.0 | A | 6.1 | 300 | 20/180 | 190 | 6.8 | 480/360 |
| 4 | 3.8 | E | 6.0 | 250 | 25/180 | 185 | 8.0 | 380/260 |
| 5 | 4.6 | M | 5.9 | 200 | 30/190 | 155 | 7.9 | 240/140 |
| 6 | 3.6 | E | 6.1 | 230 | 30/180 | 170 | 7.4 | 300/160 |
| 7 | 3.0 | A | 6.0 | 220 | 30/180 | 180 | 8.0 | 300/240 |
| 8 | 3.0 | A | 6.0 | 280 | 20/180 | 200 | 6.9 | 480/360 |
| 9 | 2.8 | A | 6.2 | 240 | 20/180 | 175 | 7.8 | 480/300 |

1 quantity of acid in grams added to 100 g of resin solids
2 E: acetic acid; M: lactic acid; A: formic acid
3 measured on a 10% aqueous solution
4 Konig pendulum hardness DIN 53 157 (sec)
5 Erichsen indentation DIN 53 156 (mm)
6 hours of water soak at 40° C. until corrosion or blistering becomes visible
7 salt spray ASTM-B 117-64: 2 mm of corrosion at the cross incision after the stated hours For this test degreased non-pretreated steel panels were coated with a pigmented paint consisting of 100 parts by weight of resin solids, 20 parts by weight of aluminum silicate pigment, and 2 parts by weight of carbon black.

In the above illustrative examples, various modifications can be made. Such modifications being within the ability of one skilled in the art are within the scope of the present invention and appended claims.

It is claimed:

1. Thermosetting binders characterized in that aqueous solutions thereof formed by neutralization with acids are cathodically depositable in an electrodeposition system comprising the reaction product of
   (A) hydroxyl group containing polymerization products of monomers including alkyl esters of acrylic and methacrylic acids and hydroxyalkyl(ene) esters of acrylic and methacrylic acids having a hydroxyl number of at least 40 mg KOH/g; and
   (B) compounds carrying per molecule an average of 0.8 to 1.5 free isocyanate groups and at least one tertiary basic aliphatically bound nitrogen atom; said reaction product having an NCO-value of substantially zero and containing basic functionality neutralizable with an inorganic or organic acid to provide an aqueous solution of said binders.

2. The thermosetting binders of claim 1 wherein the reaction product further includes a compound (C) carrying an average of 0.8 to 1.5 free isocyanate groups and from 1 to 3 olefinic double bonds.

3. The thermosetting binders of claim 1 wherein in (B) the compounds per molecule carry an average of 1.0 free isocyanate groups.

4. The thermosetting binders of claim 2 wherein compound (C) carries an average of 1.0 free isocyanate groups.

5. The thermosetting binders of claim 1 wherein the polymers of (A) are the copolymers of an alkyl ester of acrylic and/or (meth)acrylic acid, and hydroxyalkyl(ene)esters of acrylic and/or (meth)acrylic acids.

6. The thermosetting binders of claim 1 wherein compound (B) is the reaction product of a polyisocyanate and an amine of the general formula

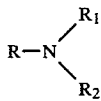

wherein R is an alkanol or hydroxyphenyl radical and $R_1$ and $R_2$ are alkyl or cycloalkyl.

7. Process for producing heat-hardenable binders for use in cathodically depositable coating compositions comprising the steps of reacting at a temperature of from about 10° to 100° C. until the NCO-value is substantially zero (A) hydroxyl group containing polymerization products of monomers including alkyl esters of acrylic and methacrylic acids and hydroxyalkyl(ene) esters of acrylic and methacrylic acids having a hydroxyl number of at least 40 mg KOH/g; and (B) a compound having per molecule an average of 0.8 to 1.5 free isocyanate groups and at least one tertiary basic aliphatically bound nitrogen atom, said binders containing case functionality neutralizable with an inorganic or organic acid to provide an aqueous solution of said binders.

8. The process of claim 7 wherein the reactants include (C) a compound carrying an average of 0.8 to 1.5 free isocyanate groups and from 1 to 3 olefinic double bonds.

9. The process of claim 8 wherein the reaction of component (A) with components (B) and (C) is carried out in random sequence or simultaneously.

10. The process of claim 8 wherein the reaction between components (A), (B), and (C) is carried out in the presence of solvents inert to isocyanates.

11. The process of claim 7 wherein the polymers of (A) are the copolymers of an alkyl ester of acrylic and/or (meth)acrylic acid, and hydroxyalkyl(ene)esters of acrylic and/or (meth)acrylic acids.

12. The process of claim 7 wherein compound (B) is the reaction product of a polyisocyanate and an amine of the general formula

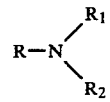

wherein R is an alkanol or hydroxyphenol radical and $R_1$ and $R_2$ are alkyl or cycloalkyl.

13. Aqueous compositions suitable for cathodic deposition in an electrodeposition system comprising the neutralized product of the reaction product of (A) hydroxyl group containing polymerization products of monomers including alkyl esters of acrylic and methacrylic acids and hydroxyalkyl(ene) esters of acrylic and methacrylic acids having a hydroxyl number of at least 40 mg KOH/g; and (B) compounds carrying per molecule an average of 0.8 to 1.5 free isocyanate groups and at least one tertiary basic aliphatically bound nitrogen atom; said reaction product having an NCO-value of substantially zero.

14. The aqueous composition of claim 13 wherein the reaction product further includes (C) a compound carrying an average of 0.8 to 1.5 free isocyanate groups and from 1 to 3 olefinic double bonds.

15. The aqueous composition of claim 13 wherein in (B) the compounds per molecule carry an average of 1.0 free isocyanate groups.

16. The aqueous composition of claim 14 wherein compound (C) carries an average of 1.0 free isocyanate groups.

17. The aqueous composition of claim 13 wherein the polymers of (A) are the copolymers of an alkyl eseter of acrylic and/or (meth)acrylic acid, and hydroxyalkyl(ene)esters of acrylic and/or (meth)acrylic acids.

18. The aqueous composition of claim 13 wherein compound (B) is the reaction product of a polyisocyanate and an amine of the general formula

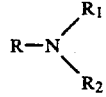

wherein R is an alkanol or hydroxyphenyl radical and $R_1$ and $R_2$ are alkyl or cycloalkyl.

* * * * *